(12) United States Patent
Fang

(10) Patent No.: US 9,948,869 B2
(45) Date of Patent: Apr. 17, 2018

(54) IMAGE FUSION METHOD FOR MULTIPLE LENSES AND DEVICE THEREOF

(71) Applicant: Yuan-Ting Fang, Taoyuan (TW)

(72) Inventor: Yuan-Ting Fang, Taoyuan (TW)

(*) Notice: Subject to any disclaimer, the term of this patent is extended or adjusted under 35 U.S.C. 154(b) by 0 days.

(21) Appl. No.: 15/201,586

(22) Filed: Jul. 4, 2016

(65) Prior Publication Data
US 2018/0007285 A1    Jan. 4, 2018

(51) Int. Cl.
*H04N 5/228* (2006.01)
*H04N 5/265* (2006.01)
*H04N 5/225* (2006.01)
*G06T 7/00* (2017.01)

(52) U.S. Cl.
CPC .......... *H04N 5/265* (2013.01); *G06T 7/0028* (2013.01); *H04N 5/2254* (2013.01); *G06T 2207/10004* (2013.01)

(58) Field of Classification Search
CPC .... H04N 5/265; H04N 5/2254; G06T 7/0028; G06T 2207/10004
USPC ............ 348/222.1, 335, 340, 345, 348, 350
See application file for complete search history.

(56) References Cited

U.S. PATENT DOCUMENTS

2015/0163479 A1* 6/2015 Inoue .................. G06T 5/50
348/47

* cited by examiner

*Primary Examiner* — Yogesh Aggarwal
(74) *Attorney, Agent, or Firm* — Li & Cai Intellectual Property (USA) Office

(57) ABSTRACT

An image fusion method for multiple lenses and device thereof, which includes the following steps: taking parallax images with different focal distances through a plurality of lenses; analyzing feature points of the parallax images; calculating the matching relationships among the feature points of the parallax images; moving each of the parallax images according to the matching relationships to adjust the same image portion of each parallax image to the same image position; fusing the moved result of the parallax images to generate a fusion image; and removing unnecessary images configured in the edge of the fusion image to generate a corrected fusion image. Therefore, the image fusion method for multiple lenses and device thereof can make the result of the image fusion better.

8 Claims, 11 Drawing Sheets

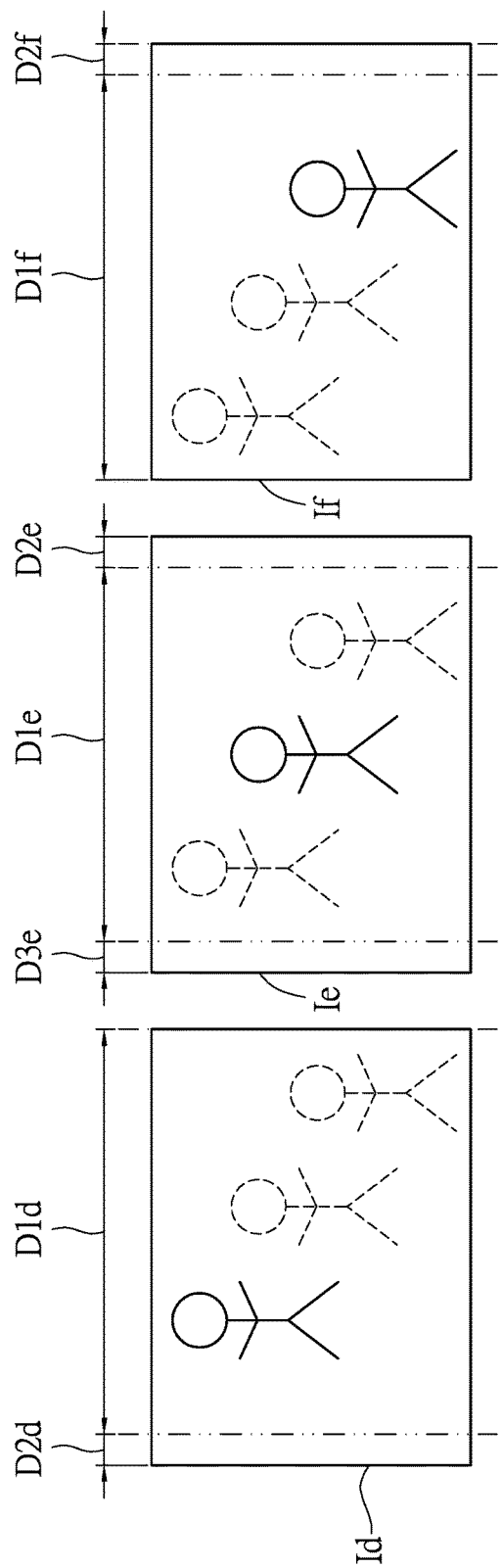

IMAGE FUSION METHOD FOR MULTIPLE LENSES AND DEVICE THEREOF

BACKGROUND

1. Technical Field

The present disclosure relates to an image fusion method and a device thereof, in particular, to an image fusion method for multiple lenses and a device thereof.

2. Description of Related Art

The present image fusion method is mainly the pyramid fusion algorithm. Other image fusion methods, for example, include SWT, CVT, NSCT, GRW, WSSM, HOSVD, and GFF. This image fusion method integrates the images having the same scenes but different focal distance into a new image. This new image is composed of the clearest portion in each image. Therefore, the camera needs to take images having the same scenes but different focal distance at different times.

When the camera moves during shooting, this may fuse the wrong image. In addition, there is a time difference problem taking images, thereby the scenes of each image are a little different. For example, the vehicle moves or the tree leaves sway, and this may cause the result of image fusion to have artifacts and a blurring phenomenon. Therefore, during shooting, if the image fusion device can reduce moving and can avoid a time difference problem taking images simultaneously, this will improve the result of the image fusion.

SUMMARY

Accordingly, an objective of the present disclosure is to provide an image fusion method for multiple lenses and a device thereof, which take parallax images with different focal distances through a plurality of lenses and adjust the parallax images, to perform the image fusion. Accordingly, the image fusion method for multiple lenses and the device thereof can simultaneously solve the problem of the camera moving and the problem of time difference of the parallax images, so that the result of the image fusion becomes better.

An exemplary embodiment of the present disclosure provides an image fusion method for multiple lenses. The image fusion method is adapted for an image fusion device with a plurality of lenses. The image fusion method includes the following steps: taking a plurality of parallax images with different focal distances through the lenses; analyzing a plurality of feature points of the parallax images; calculating matching relationships among the feature points of the parallax images; moving each parallax image according to the matching relationships, to adjust a same image portion of each parallax image to a same image position; and fusing the moved result of the parallax images, to generate a fusion image.

An exemplary embodiment of the present disclosure provides an image fusion device for multiple lenses. The image fusion device includes a plurality of lenses, an image capture, and an image processor. The image capture is electrically connected to the lenses. The image capture is configured for taking a plurality of parallax images with different focal distances through the lenses. The image processor is electrically connected to the image capture. The image processor is configured for receiving the parallax images, and executing the following steps: analyzing a plurality of feature points of the parallax images; calculating matching relationships among the feature points of the parallax images; moving each parallax image according to the matching relationships, to adjust a same image portion of each parallax image to a same image position; fusing the moved result of the parallax images, to generate a fusion image; and removing an unnecessary image configured in the edge of the fusion image, to generate the corrected fusion image.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 6A-6E is a diagram of an image fusion method according to another exemplary embodiment of the present disclosure.

DESCRIPTION OF THE EXEMPLARY EMBODIMENTS

Figure 1:
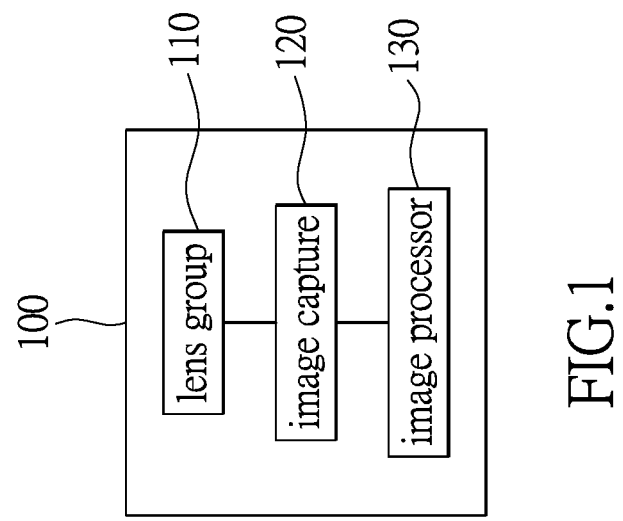
FIG. 1 is a diagram of an image fusion device according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides an image fusion method for multiple lenses and a device thereof, which takes parallax images with different focal distances through a plurality of lenses and adjusts the same image portion of each parallax image to the same image position according to the matching relationships (i.e., the matching relationships of the image position) among feature points of each parallax image. Lastly, fusing the adjusted parallax images to generate a fusion image. Accordingly, the image fusion method and the device can simultaneously solve the problem of the camera moving and the problem of time difference of the parallax images, thereby avoiding the fusion image having artifacts and a blurring phenomenon, making the result of the image fusion better. In addition, the image fusion device simultaneously captures the parallax images (i.e., there is no time difference problem for each parallax image). This can acquire a better result for the image fusion, even if the image fusion device shoots a moving object. The image fusion method for multiple lenses and a device thereof provided in the exemplary embodiment of the present disclosure will be described in the following paragraphs.

Firstly, please refer to FIG. 1, which shows a diagram of an image fusion device according to an exemplary embodiment of the present disclosure. As shown in FIG. 1, the image fusion device 100 is used to simultaneously capture a plurality of images of external objects, and takes the captured images as the source of the image fusion. In the present disclosure, the image fusion device 100 can be a smart phone, video recorder, tablet computer, notebook, or other electronic device needed to execute the image fusion. The present disclosure is not limited thereto.

The image fusion device 100 includes a lens group 110, an image capture 120, and an image processor 130. As shown in FIG. 1, the lens group 110 has multiple lenses (not shown in FIGs). In the present disclosure, the lenses are configured in a same plane (not shown in FIGs) and there is a predefined distance among the adjacent lenses.

The image capture 120 electrically connects to the lenses of the lens group 110, and takes a plurality of parallax images with different focal distances through the lenses. For example, the lens group 110 has two lenses. The image capture 120 takes two images with different focal distances as two parallax images through two lenses, such as the parallax images Ia and Ib shown in FIG. 4A. In each parallax image, the image corresponding to the focal distance is clearest (e.g., the solid line). The farther the focal distance, the more blurred the image (e.g., the dotted line). For example, in the parallax image Ia, the focal distance is located on the left person (i.e., the solid line). The farther the focal distance, the more blurred the image (e.g., the right person of the dotted line). In the parallax image Ib, the focal distance is located on the right person (i.e., the solid line). The farther the focal distance, the more blurred the image (e.g., the left person of the dotted line). Due to there being a predefined distance between the adjacent lenses, there is distance difference between the parallax images Ia and Ib. Therefore, the parallax images Ia and Ib have a same image portion D1a and D1b (i.e., having the same image content), and a different image portion D2a and D2b (i.e., having different image content), as shown in FIG. 4A.

The image processor 130 electrically connects to the image capture 120 and receives the parallax images transmitted from the image capture 120. The image processor 130 executes the following steps, to adjust the same image portion of the received parallax images to a same image position, and to fuse the adjusted parallax images.

Figure 2:
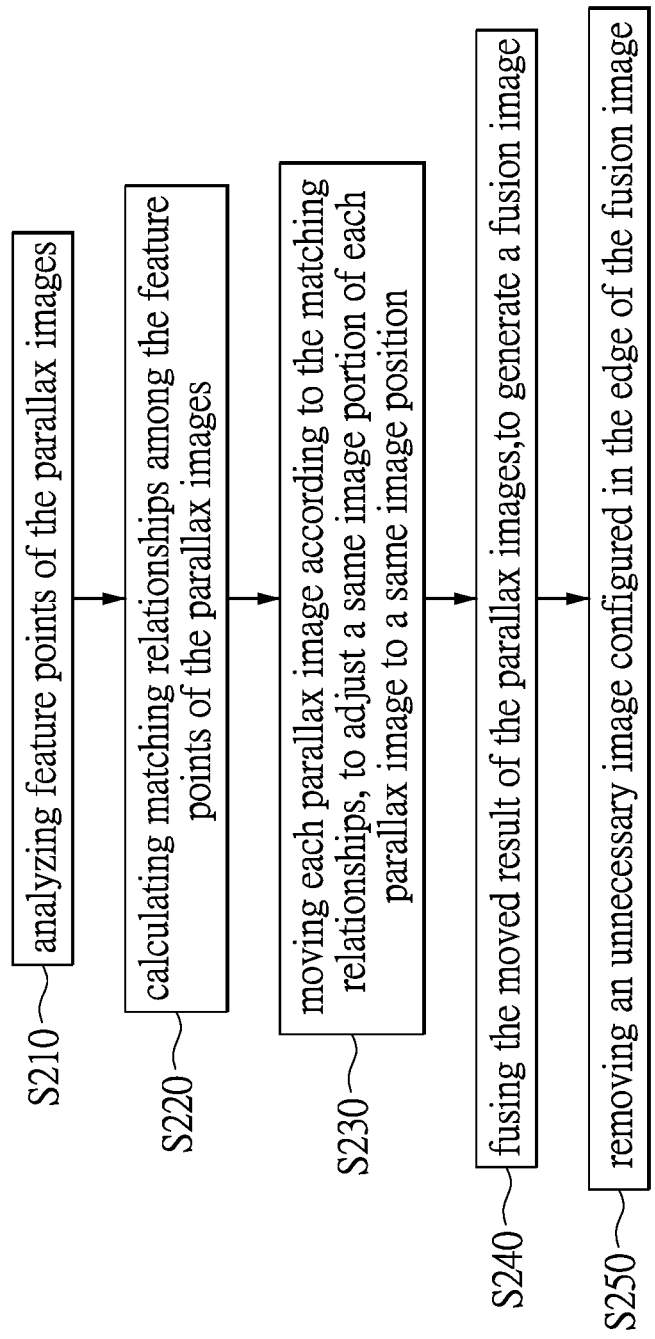
FIG. 2 is a flowchart of an image fusion method for multiple lenses according to an exemplary embodiment of the present disclosure.

Please refer to FIGS. 1-2. FIG. 2 shows a flowchart of an image fusion method for multiple lenses according to an exemplary embodiment of the present disclosure. Firstly, the image processor 130 analyses a plurality of feature points of the parallax images (step S210). In the present disclosure, the image processor 130 can use the scale-invariant feature transform (SIFT) algorithm to search for the feature points of the parallax images. Those skilled in the art should know the implementation of searching for the feature points of the parallax images, and further descriptions are hereby omitted. The feature points of the parallax images can be calculated by other algorithms, such as corner detector, speeded up robust feature (SURF), or etc. The present disclosure is not limited thereto. All pixels of the parallax images or other information indicating the parallax images can be taken as the feature points, and the present disclosure is not limited thereto.

Figure 4A:
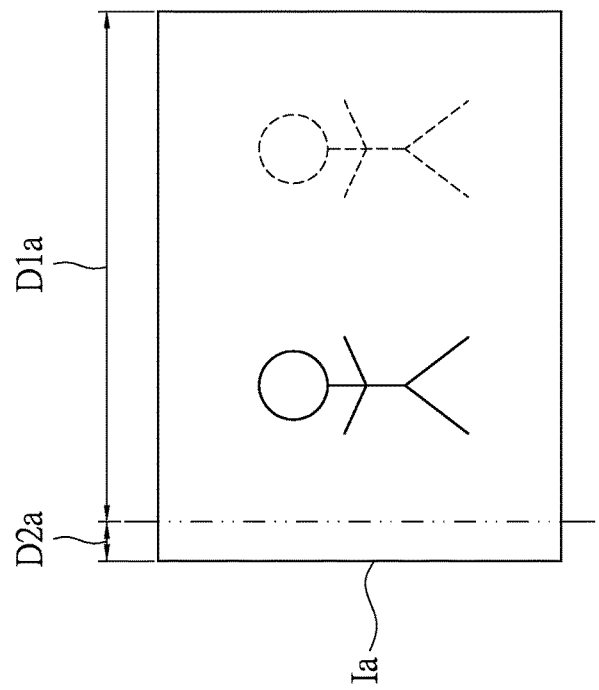
FIG. 4A-4D is a diagram of an image fusion method according to an exemplary embodiment of the present disclosure.
Figure 4A:
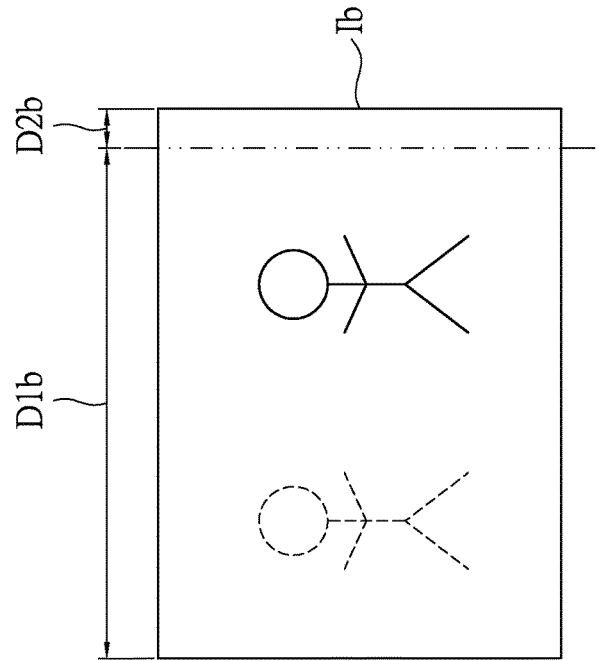
Figure 4B:
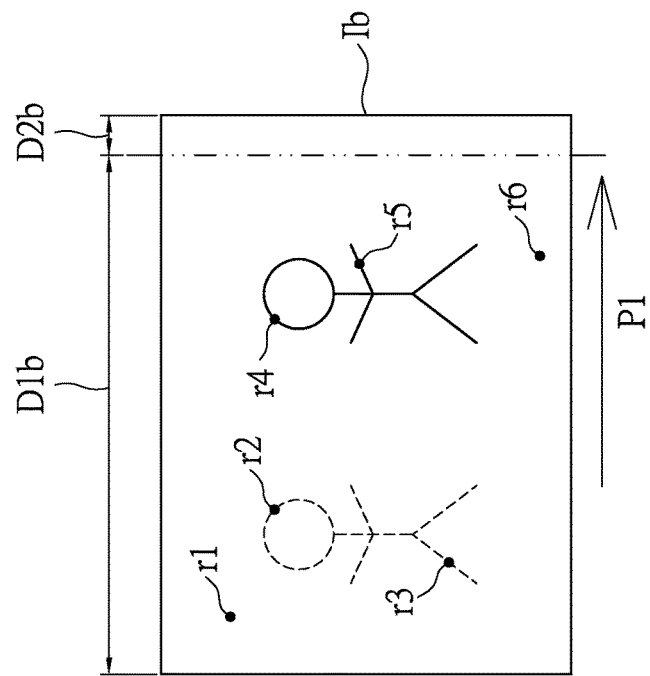
Figure 4B:
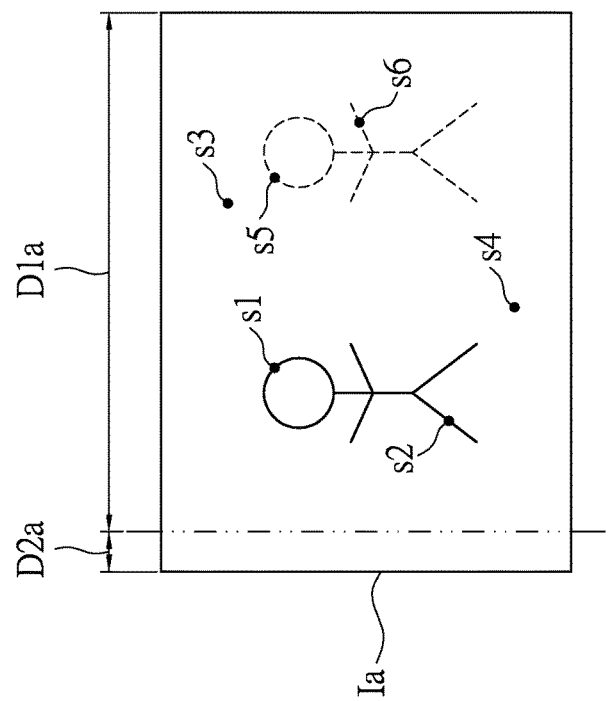

For example, please refer to FIGS. 4A and 4B, the image capture 120 takes parallax images Ia and Ib with different focal distances simultaneously through two lenses. The relationship between the parallax images Ia and Ib are illustrated in the aforementioned example, so their detailed description is omitted. Therefore, in the parallax image Ia, the focal distance is located on the left person and there is a same image portion D1a and a different image portion D2a. In the parallax image Ib, the focal distance is located on the right person and there is a same image portion D1b and a different image portion D2b. The image processor 130 then analyses the feature points of the parallax image Ia by the SIFT algorithm. The image processor 130 analyses the parallax image Ia having six feature points s1, s2, s3, s4, s5, s6 and the parallax image Ib having six feature points r1, r2, r3, r4, r5, r6, as shown in FIG. 4B.

Next, the image processor 130 calculates matching relationships among the feature points of the parallax images (step S220). In the present disclosure, the image processor 130 searches the feature points of each parallax image suitable for the matching position by the random sample consensus (RANSAC) algorithm. Those skilled in the art shall know the implementation of searching the feature points of the parallax images, and further descriptions are hereby omitted. The feature points can be calculated by other algorithms, and the present disclosure is not limited thereto.

Carrying on with the example above, the image processor 130 calculates the feature point s1 matching the feature point r2, the feature point s2 matching the feature point r3, the feature point s5 matching the feature point r4, and the feature point s6 matching the feature point r5. There are no matching relationships among the feature points s3 and s4 of the parallax image Ia and the feature points r1 and r6 of the parallax image Ib.

After calculating the matching relationships among the feature points of each parallax image (i.e., step S220), the image processor 130 moves each parallax image according to the matching relationships, to adjust a same image portion of each parallax image to a same image position (step S230). Carrying on with the example above, the parallax image Ia has the same image portion D1a and the different image portion D2a. The parallax image Ib has the same image portion D1b and the different image portion D2b. Therefore, the image processor 130 adjusts the same image portion D1a and D1b to a same image position according to the matching relationships.

Figure 3:
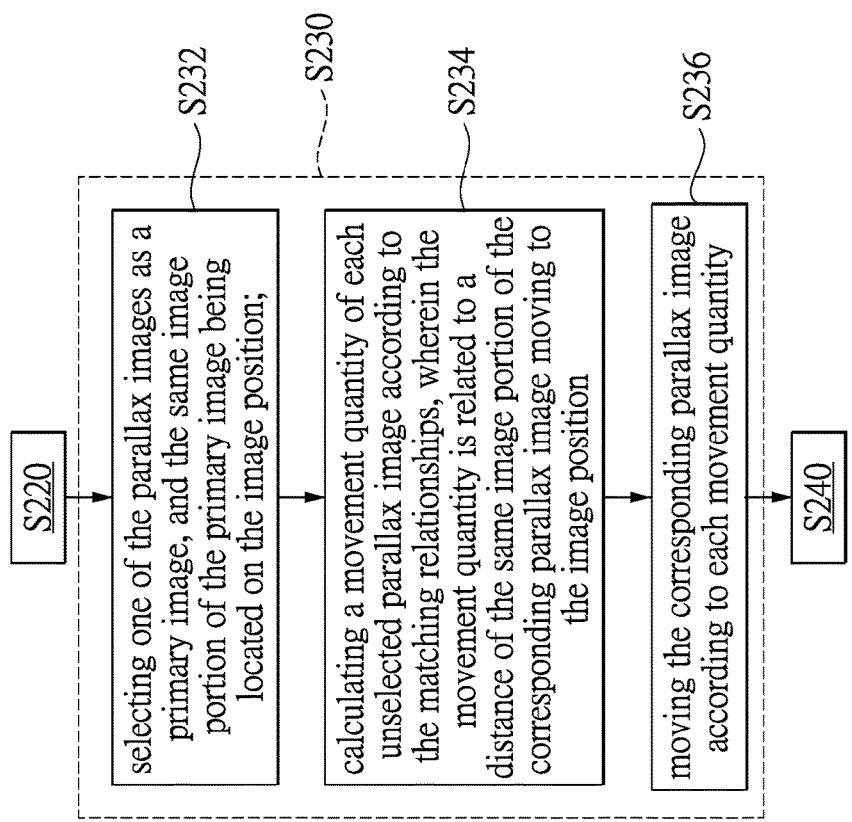
FIG. 3 is a detailed flowchart of moving each parallax image according to an exemplary embodiment of the present disclosure.

More specifically, please refer to FIG. 3, which shows a detailed flowchart of moving each parallax image according to an exemplary embodiment of the present disclosure. Firstly, the image processor 130 selects one of the parallax images as a primary image, and the same image portion of the primary image is located on the aforementioned image position, i.e., the image processor 130 takes the image position located on the same image portion of the primary image as the reference position (step S232). Then the image processor 130 calculates a movement quantity of each unselected parallax image according to the matching relationships. The movement quantity is related to a distance of the same image portion of the corresponding parallax image moving to the image position (step S234). Lastly, the image processor 130 moves the corresponding parallax image according to each movement quantity (step S236).

Carrying on with the example above, the image processor 130 takes the parallax image Ia as the primary image. The image position located on the same image portion D1*a* of the parallax image Ia is set as the reference position. Next, the image processor 130 calculates the movement quantity of the unselected parallax image Ib according to the matching relationships. The movement quantity indicates the distance of the same image portion D1*b* of the parallax image Ib moving to the reference position (the image position located on the same image portion D1*a* of the parallax image Ia). Lastly, the image processor 130 moves the parallax image Ib toward the right direction P1 according to the movement quantity of the parallax image Ib, to adjust the same image portion D1*b* of the parallax image Ib to the reference position (i.e., the image position located on the same image portion D1*a* of the parallax image Ia). The image processor 130 also takes the parallax image Ib as the primary image, and then repeats the flowchart of steps S232-S236, to adjust the same image portion D1*a* of the parallax image Ia to the image position located on the same image portion D1*b* of the parallax image Ib. The present disclosure is not limited thereto.

After adjusting the same image portion of each parallax image to a same image position (step S230), the image processor 130 fuses the moved result of the parallax images, to generate a fusion image (step S240). This means that the image processor 130 fuses the clear image portion (i.e., corresponding to the position of the focal distance) of the same image portion of each parallax image to generate a fusion image (i.e., having the clear image portion of each parallax image) during the image fusion process. Those skilled in the art shall know the implementation of the image fusion, and further descriptions are hereby omitted.

Figure 4D:
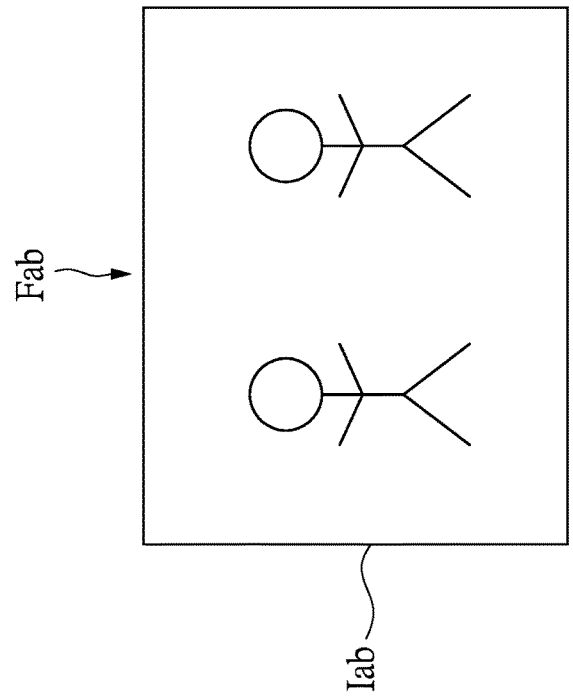
Figure 4C:
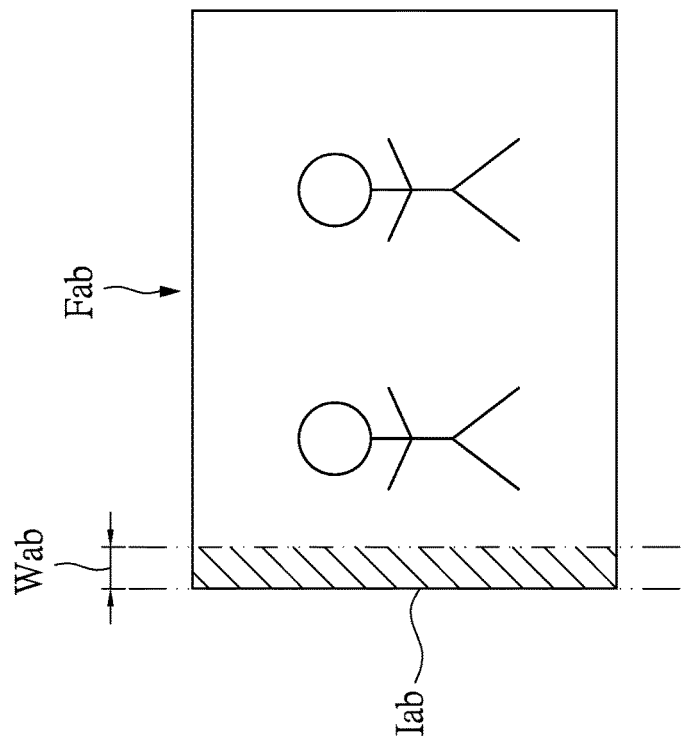

Carrying on with the example above, as shown in FIG. 4C, the image processor 130 fuses the moved result of the parallax images Ia and Ib, to generate the fusion image Iab. During the image fusion process, the image processor 130 fuses the clear image portion (i.e., the left person of the same image portion D1*a* and the right person of the same image portion D1*b*) of the same image portions D1*a* and D1*b* to generate a fusion image Iab, so that the fusion image Iab has the clear image portion of the parallax images Ia and Ib. Therefore, the fusion image Iab is clearer than the parallax images Ia and Ib.

The image processor 130 generates the fusion image according to the moved result of the parallax images. As shown in FIG. 4B, the same image portion D1*b* of the parallax image Ib is moved toward the right direction P1, to adjust the same image portion D1*b* to the image position located on the same image portion D1*a* of the parallax image Ia. Therefore, there is an unnecessary image configured in the edge of the fusion image after the parallax images moving. After generating the fusion image Iab (i.e., step S240), the image processor 130 removes the unnecessary image configured in the edge of the fusion image, to generate the corrected fusion image, thereby generating the better fusion image (step S250). Carrying on with the example above, as shown in FIGS. 4C and 4D, the image processor 130 further removes the unnecessary image Wab configured in the edge of the fusion image Iab (in the present disclosure, the unnecessary image Wab is blank image), to generate the corrected fusion image Fab.

In addition, the step S230 (i.e., the image processor 130 moves each parallax image according to the matching relationships, to adjust a same image portion of each parallax image to a same image position) can be implemented by other methods, as in the following description.

For convenience, the following description is based on the example that the image capture 120 simultaneously takes three images with different focal distances as three parallax images through three lenses. As the parallax images Id, Ie, and If shown in FIG. 6A, the image corresponding to the focal distance is clearest (e.g., the solid line). The farther the focal distance, the more blurred the image (e.g., the dotted line). For example, in the parallax image Id, the focal distance is located on the left person (i.e., the solid line). The farther the focal distance, the more blurred the image (e.g., the middle person and the right person of the dotted line). In the parallax image Ie, the focal distance is located on the middle person (i.e., the solid line). The farther the focal distance, the more blurred the image (e.g., the left person and the right person of the dotted line). In the parallax image If, the focal distance is located on the right person (i.e., the solid line). The farther the focal distance, the more blurred the image (e.g., the left person and the middle person of the dotted line). Due to there being a predefined distance between the adjacent lenses, there is a distance difference between the parallax images Id, Ie, and If. Therefore, the parallax images Id and Ie have a same image portion D1*d* and D1*e* (i.e., having the same image content), and a different image portion D2*d* and D2*e* (i.e., having the different image content). The parallax images Id and Ie have a same image portion D1*d*, D1*e*, and D3*e* (i.e., having the same image content), and a different image portion D2*d* and D2*e* (i.e., having the different image content). The parallax images Ie and If have a same image portion D1*e*, D2*e*, and D1*f* (i.e., having the same image content), and a different image portion D3*e* and D2*f* (i.e., having the different image content).

Figure 6B:
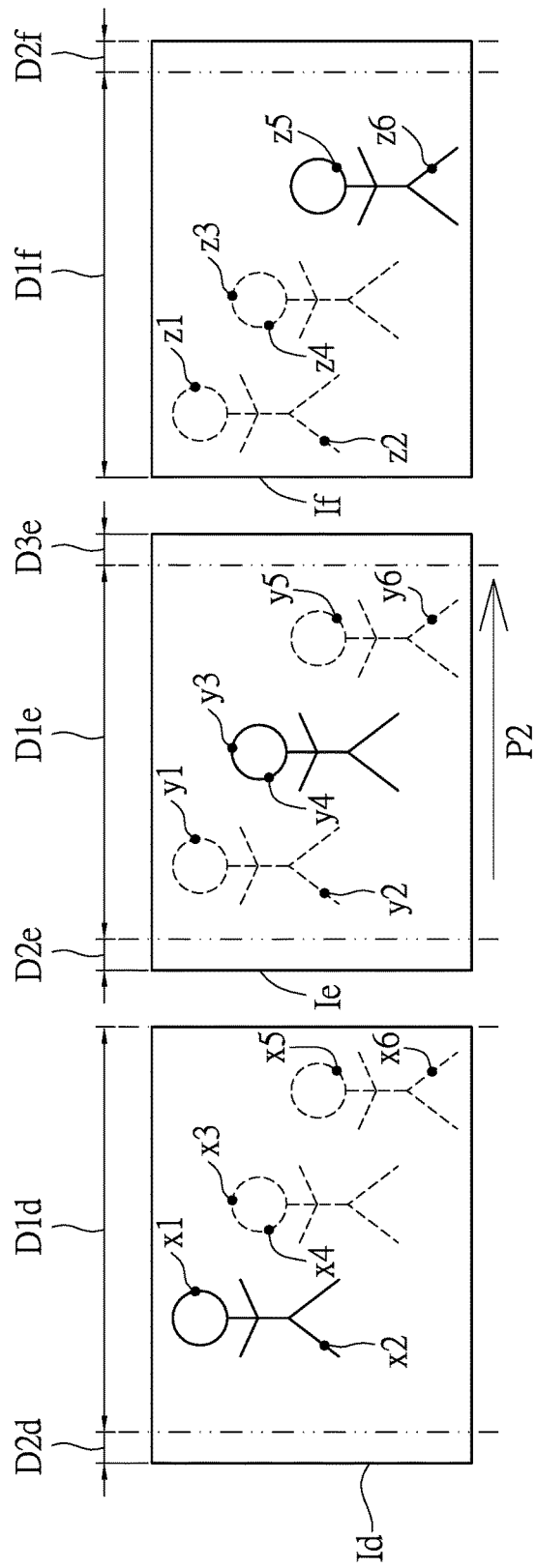

Next, as shown in FIG. 6B, the image processor 130 analyses the parallax image Id having six feature points x1, x2, x3, x4, x5, x6, the parallax image Ie having six feature points y1, y2, y3, y4, y5, y6, and the parallax image If having six feature points z1, z2, z3, z4, z5, z6 by the SIFT algorithm, as in the step S210. Next, the image processor 130 calculates the feature points x1-x6 matching the feature points y1-y6 respectively and calculates the feature points x1-x6 matching the feature points z1-z6 respectively by the RANSAC algorithm, as the step S220.

After the step S220, the image processor 130 changes to the different method shown in the steps S232-S234, in FIG. 3, to move each parallax image, thereby adjusting the same image portion of each parallax image to a same image position, the detailed description is shown as follows.

Figure 5:
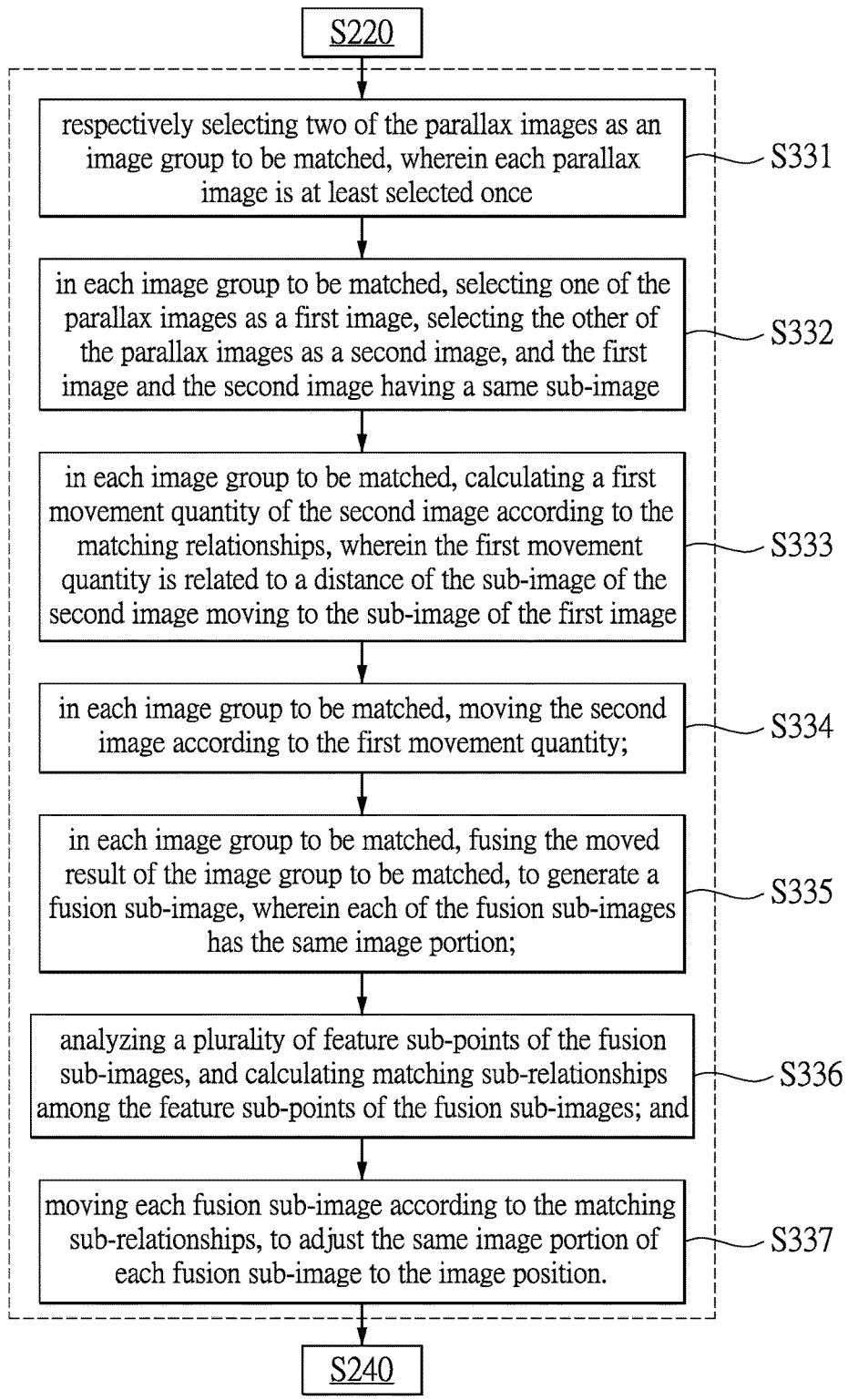
FIG. 5 is a detailed flowchart of moving each parallax image according to another exemplary embodiment of the present disclosure.

Please refer to FIG. 5, which shows a detailed flowchart for moving each parallax image according to another exemplary embodiment of the present disclosure. Firstly, the image processor 130 respectively selects two of the parallax images as an image group to be matched. Each parallax image is at least selected once. Each parallax image can be selected repeatedly. (step S331). For example, as shown in FIG. 6B, the image processor 130 selects the parallax images Id and Ie as the first image group to be matched and selects the parallax images Ie and If as the second image group to be matched.

Next, in each image group to be matched, the image processor 130 selects one of the parallax images as the first image and the other of the parallax images as the second image. The first image and the second image have the same sub-image (step S332). Carrying on with the example above, as shown in FIG. 6B, in the first image group to be matched, the image processor 130 selects the parallax image Id as the first image and the parallax image Ie as the second image. The parallax image Id and the parallax image Ie have the same sub-image, i.e., the same image portions D1d, D1e, and D3e. In the second image group to be matched, the image processor 130 selects the parallax image Ie as the first image and the parallax image If as the second image. The parallax image Ie and the parallax image If have the same sub-image, i.e., the same image portions D1e, D2e, and D1f.

Next, in each image group to be matched, the image processor 130 calculates a first movement quantity of the second image according to the matching relationships. The first movement quantity is related to a distance of the sub-image of the second image moving to the sub-image of the first image (step S333). Carrying on with the example above, as shown in FIG. 6B, in the first image group to be matched, the image processor 130 calculates the first movement quantity of the second image (i.e., the parallax image Ie) according to the matching relationships. The first movement quantity indicates that the distance of the sub-image of the second image (i.e., the same image portions D1e and D3e of the parallax image Ie) moves to the sub-image of the first image (i.e., the same image portions D1d of the parallax image Id). In the second image group to be matched, the image processor 130 calculates the first movement quantity of the second image (i.e., the parallax image If) according to the matching relationships. The first movement quantity indicates that the distance of the sub-image of the second image (i.e., the same image portions D1f of the parallax image If) moves to the sub-image of the first image (i.e., the same image portions D1e and D3e of the parallax image Ie).

Next, in each image group to be matched, the image processor 130 moves the second image according to the first displacement quantity (step S334). Carrying on with the example above, as shown in FIG. 6B, in the first image group to be matched, the image processor 130 moves the parallax image Ie toward the right direction P2 according to the first displacement quantity of the parallax image Ie, to adjust the same image portions D1e and D3e of the parallax image Ie to the image position located on the same image portion D1d of the parallax image Id. In the second image group to be matched, the image processor 130 moves the parallax image If toward the right direction P2 according to the first displacement quantity of the parallax image If, to adjust the same image portions D1f of the parallax image If to the image position located on the same image portion D1e and D2e of the parallax image Ie.

Figure 6C:
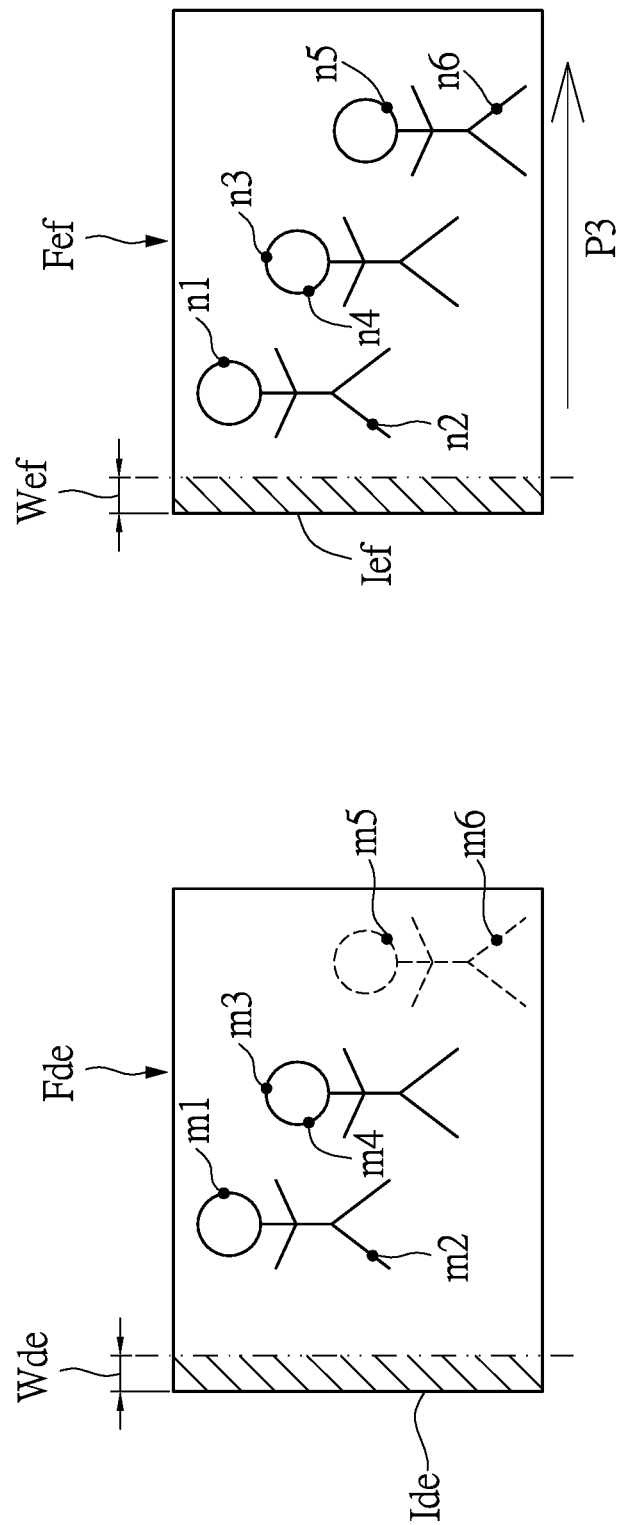

Next, in each image group to be matched, the image processor 130 fuses the moved result of the image group to be matched, to generate a fusion sub-image. Each of fusion sub-images has the same image portion (step S335). Carrying on with the example above, as shown in FIG. 6C, the image processor 130 fuses the moved result of the parallax images Id and Ie, to generate the fusion sub-image Ide and fuses the moved result of the parallax images Ie and If, to generate the fusion sub-image Ief. At present, the fusion sub-images Ide and Ief have the same image portions Fde and Fef. The fusion sub-images Ide and Ief also have the unnecessary images Wde and Wef respectively (in the present disclosure, the unnecessary image is a blank image).

Next, the image processor 130 analyses a plurality of feature sub-points of each fusion sub-image, and calculates matching sub-relationships among the feature sub-points of the fusion sub-images (step S336). Carrying on with the example above, as shown in FIG. 6C, the image processor 130 analyses that the fusion sub-image Ide has six feature sub-points m1, m2, m3, m4, m5, m6 and the fusion sub-image Ief has six feature sub-points n1, n2, n3, n4, n5, n6 by the SIFT algorithm. Then the image processor 130 calculates the feature sub-points m1-m6 of the fusion sub-image Ide matching the feature sub-points n1-n6 of the fusion sub-image Ief respectively by the RANSAC algorithm, i.e., the matching sub-relationships.

Lastly, the image processor 130 moves each fusion sub-image according to the matching sub-relationships, to adjust the same image portion of each fusion sub-image to an image position (step S337). Carrying on with the example above, the fusion sub-images Ide and Ief have same image portions Fde and Fef. Therefore, the image processor 130 adjusts the same image portion Fde of the fusion sub-image Ide and the same image portion Fef of the fusion sub-image Ief to a same image position according to the matching sub-relationships.

With respect to the step of the image processor 130 moving each fusion sub-image according to the matching sub-relationships, it is inferred from the steps S232-S236, FIGS. 3 and 4B substantially. Firstly, the image processor 130 selects one of the fusion sub-image as a primary image. The same image portion of the primary image is located on the aforementioned image position, i.e., the image processor 130 takes the image position located on the same image portion of the primary image as the reference position. Then the image processor 130 calculates a second movement quantity of each unselected fusion sub-image according to the matching sub-relationships. The second movement quantity is related to a distance of the same image portion of the corresponding fusion sub-image moving to the image position. Lastly, the image processor 130 moves the corresponding parallax sub-image according to each second movement quantity.

Carrying on with the example above, the image processor 130 takes the fusion sub-image Ide as the primary image. The image position located on the same image portion Fde of the fusion sub-image Ide is set as the reference position. Next, the image processor 130 calculates the second movement quantity of the unselected fusion sub-image Ief according to the matching sub-relationships. The second movement quantity indicates the distance of the same image portion Fef of the fusion sub-image Ief moving to the reference position (i.e., the image position located on the same image portion Fde of the fusion sub-image Ide). Lastly, the image processor 130 moves the fusion sub-image Ief toward the right direction P3 according to the movement quantity of the fusion sub-image Ief, to adjust the same image portion Fef of the fusion sub-image Ief to the reference position (i.e., the image position located on the same image portion Fde of the fusion sub-image Ide).

Figure 6E:
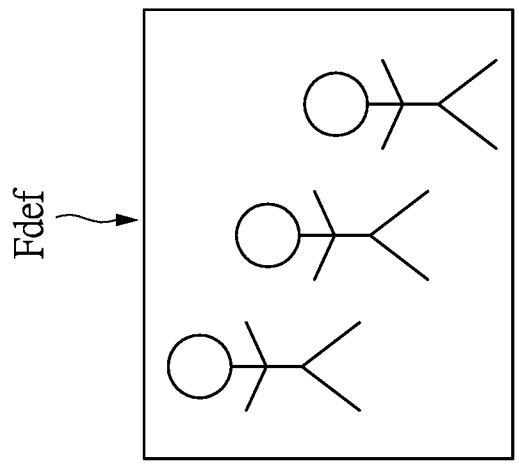
Figure 6D:
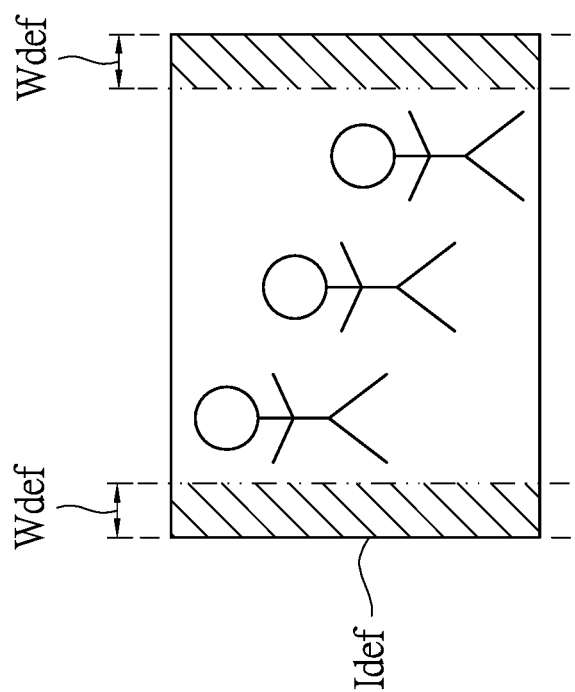

After adjusting the same image portion of each fusion sub-image to a same image position (i.e., the step S337), the image processor 130 executes the step S240, to fuse the moved result of the parallax images and to generate the fusion image. Carrying on with the example above, as shown in FIG. 6D, the image processor 130 fuses the moved result of the parallax images Id, Ie, and If (i.e., the moved result of the fusion sub-images Ide and Ief), to generate the fusion image Idef.

After generating the fusion image, the image processor 130 removes the unnecessary image configured in the edge of the fusion image, to generate the corrected fusion image, thereby generating the better fusion image. Carrying on with the example above, as shown in FIGS. 6D and 6E, the image processor 130 further removes the unnecessary image Wdef configured in the edge of the fusion image Idef (in the present disclosure, the unnecessary image Wdef is two blank images), to generate the corrected fusion image Fdef.

In summary, the invention provides an image fusion method for multiple lenses and a device thereof, which take parallax images with different focal distances through a plurality of lenses and adjust the same image portion of each parallax image to the same image position. Lastly, fusing the adjusted parallax images to generate a fusion image. Accordingly, the image fusion method and the device can simultaneously solve the problem of the camera moving and the problem of time difference of the parallax images, thereby avoiding the fusion image having artifacts and blurring phenomenon, to make a better result for the image fusion. In addition, the image fusion device simultaneous capture the parallax images (i.e., there is no time difference problem of each parallax image). This can acquire a better result for the image fusion, even if the image fusion device shoots a moving object.

The abovementioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An image fusion method for multiple lenses, adapted for an image fusion device with a plurality of lenses, and the image fusion method comprising:
   taking a plurality of parallax images with different focal distances through the lenses;
   analysing a plurality of feature points of the parallax images;
   calculating matching relationships among the feature points of the parallax images;
   moving each parallax image according to the matching relationships, to adjust a same image portion of each parallax image to a same image position; and
   fusing the moved result of the parallax images, to generate a fusion image;
   wherein in the step of moving each parallax image, further comprises:
      selecting one of the parallax images as a primary image, and the same image portion of the primary image being located on the image position;
      calculating a movement quantity of each unselected parallax image according to the matching relationships, wherein the movement quantity is related to a distance of the same image portion of the corresponding parallax image moving to the image position; and
      moving the corresponding parallax image according to each movement quantity.

2. The image fusion method according to claim 1, wherein the lenses are configured in a same plane and there is a predefined distance among the adjacent lenses.

3. The image fusion method according to claim 1, wherein the step after generating the fusion image, further comprising:
   removing an unnecessary image configured in the edge of the fusion image, to generate the corrected fusion image.

4. An image fusion method for multiple lenses, adapted for an image fusion device with a plurality of lenses, and the image fusion method comprising:
   taking a plurality of parallax images with different focal distances through the lenses;
   analysing a plurality of feature points of the parallax images;
   calculating matching relationships among the feature points of the parallax images;
   moving each parallax image according to the matching relationships, to adjust a same image portion of each parallax image to a same image position; and
   fusing the moved result of the parallax images, to generate a fusion image;
   wherein in the step of moving each parallax image, further comprises:
      respectively selecting two of the parallax images as an image group to be matched, wherein each parallax image is at least selected once;
      in each image group to be matched, selecting one of the parallax images as a first image, selecting the other of the parallax images as a second image, and the first image and the second image having a same sub-image;
      in each image group to be matched, calculating a first movement quantity of the second image according to the matching relationships, wherein the first movement quantity is related to a distance of the sub-image of the second image moving to the sub-image of the first image;
      in each image group to be matched, moving the second image according to the first movement quantity;
      in each image group to be matched, fusing the moved result of the image group to be matched, to generate a fusion sub-image, wherein each of the fusion sub-images has the same image portion;
      analyzing a plurality of feature sub-points of the fusion sub-images, and calculating matching sub-relationships among the feature sub-points of the fusion sub-images; and
      moving each fusion sub-image according to the matching sub-relationships, to adjust the same image portion of each fusion sub-image to the image position.

5. The image fusion method according to claim 4, wherein in the step of moving each fusion sub-image, further comprises:
   selecting one of the fusion sub-images as a primary image, and the same image portion of the primary image being located on the image position;
   calculating a second movement quantity of each unselected fusion sub-image according to the matching sub-relationships, wherein the second movement quantity is related to a distance of the same image portion of the corresponding fusion sub-image moving to the image position; and
   moving the corresponding fusion sub-image according to each second movement quantity.

6. An image fusion device for multiple lenses, comprising:
   a plurality of lenses;
   an image capture, electrically connected to the lenses, and configured for taking a plurality of parallax images with different focal distances through the lenses;
   an image processor, electrically connected to the image capture, configured for receiving the parallax images, and executing the following steps:
   analyzing a plurality of feature points of the parallax images;
   calculating matching relationships among the feature points of the parallax images;
   moving each parallax image according to the matching relationships, to adjust a same image portion of each parallax image to a same image position;
   fusing the moved result of the parallax images, to generate a fusion image; and removing an unnecessary image configured in the edge of the fusion image, to generate the corrected fusion image;

wherein in the step of the image processor moving each parallax image, further comprises:

selecting one of the parallax images as a primary image, and the same image portion of the primary image being located on the image position;

calculating a movement quantity of each unselected parallax image according to the matching relationships, wherein the movement quantity is related to a distance of the same image portion of the corresponding parallax image moving to the image position; and moving the corresponding parallax image according to each movement quantity.

7. An image fusion device for multiple lenses, comprising:

a plurality of lenses;

an image capture, electrically connected to the lenses, and configured for taking a plurality of parallax images with different focal distances through the lenses;

an image processor, electrically connected to the image capture, configured for receiving the parallax images, and executing the following steps:

analyzing a plurality of feature points of the parallax images;

calculating matching relationships among the feature points of the parallax images;

moving each parallax image according to the matching relationships, to adjust a same image portion of each parallax image to a same image position;

fusing the moved result of the parallax images, to generate a fusion image; and removing an unnecessary image configured in the edge of the fusion image, to generate the corrected fusion image;

wherein in the step of the image processor moving each parallax image, further comprises:

respectively selecting two of the parallax images as an image group to be matched, wherein each parallax image is at least selected once;

in each image group to be matched, selecting one of the parallax image as a first image, selecting the other of the parallax image as a second image, and the first image and the second image having a same sub-image;

in each image group to be matched, calculating a first movement quantity of the second image according to the matching relationships, wherein the first movement quantity is related to a distance of the sub-image of the second image moving to the sub-image of the first image;

in each image group to be matched, moving the second image according to the first movement quantity;

in each image group to be matched, fusing the moved result of the image group to be matched, to generate a fusion sub-image, wherein each of the fusion sub-images has the same image portion;

analyzing a plurality of feature sub-points of the fusion sub-images, and calculating matching sub-relationships among the feature sub-points of the fusion sub-images; and moving each fusion sub-image according to the matching sub-relationships, to adjust the same image portion of each fusion sub-image to the image position.

8. The image fusion device according to claim 7, wherein in the step of moving each fusion sub-image, further comprises:

selecting one of the fusion sub-images as a primary image, and the same image portion of the primary image being located on the image position;

calculating a second movement quantity of each unselected fusion sub-image according to the matching sub-relationships, wherein the second movement quantity is related to a distance of the same image portion of the corresponding fusion sub-image moving to the image position; and moving the corresponding fusion sub-image according to each second movement quantity.

* * * * *